3,280,105
3-AZABICYCLO[3.2.2]NONANE AND PREPARATION THEREOF

Vada L. Brown, James G. Smith, and Theodore E. Stanin, Kingsport, Tenn., assignors to Eastman Kodak Company, Rochester, N.Y., a corporation of New Jersey
No Drawing. Filed May 21, 1962, Ser. No. 196,494
10 Claims. (Cl. 260—239)

This invention relates to a new organic compound. More particularly, it relates to the compound, 3-azabicyclo [3.2.2]nonane, and to methods for preparing it.

This application is a continuation-in-part of our copending application of the same title, Serial No. 82,373, filed January 31, 1961, and now abandoned.

The compound, 1-azabicyclo[3.2.2]nonane, has been disclosed in the literature. However, 3-azabicyclo[3.2.2]nonane, which is significantly different because of the position of the amino group, has not previously been prepared and no method for its preparation has been known. Malachowski et al, Ber., 71, 759–763 (1938), were unable to isolate this compound and indicated that it would contain a yet unknown ring system. Our discovery of methods of preparation now makes the valuable new compound available.

We have discovered that 3-azabicyclo[3.2.2]nonane can be obtained in the reaction of 1,4-cyclohexanedimethanol with ammonia over Raney nickel catalyst as follows:

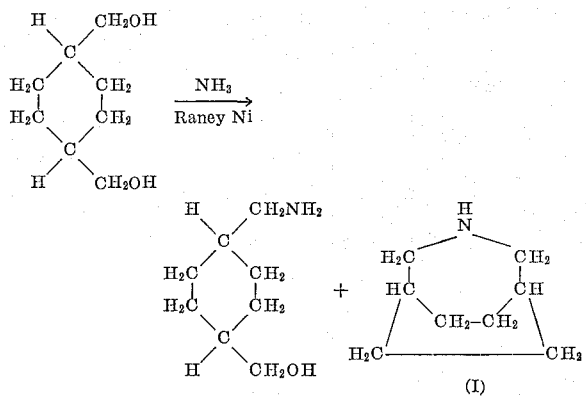

The reaction is illustrated by the following example:

EXAMPLE 1

To an autoclave was charged 1,4-cyclohexanedimethanol and anhydrous ammonia in a 1:4 molar ratio with 1% by weight of Raney nickel based on the 1,4-cyclohexanedimethanol. The autoclave was sealed and heated at autogenous pressure for 8 hours at a temperature of 225° C. After 8 hours the autoclave was cooled, vented to the atmosphere and the product removed. The crude product was then filtered to remove the Raney nickel. From the crude aminated product, 3-azabicyclo [3.2.2]nonane is isolated by fractional distillation at reduced pressure.

During distillation of the crude product obtained by this procedure we observed that the new compound (I) crystallized in the still head. Chemical analysis and molecular weight established its empirical formula as $C_8H_{15}N$. Its benzenesulfonamide derivative was obtained as follows:

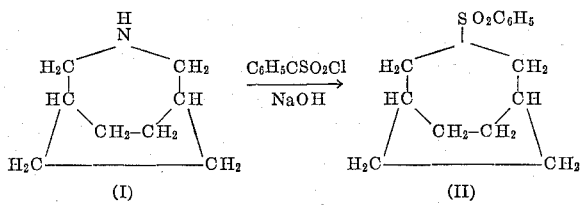

The derivative (II) was not soluble in aqueous alkali, indicating that the compound (I) was a secondary amine. The nuclear magnetic resonance spectrum of the material was in agreement with the 3-azabicyclo[3.2.2]nonane structure. Finally, oxidation of the amine (I) with alkaline potassium permanganate produced 1,4-cyclohexanedicarboxylic acid, as follows:

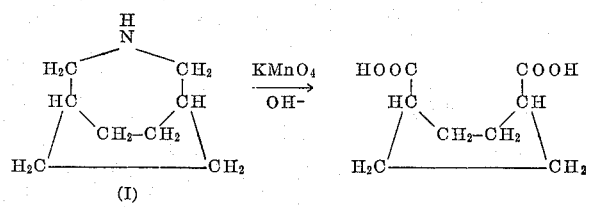

Although the method of Example 1 can be used for synthesizing our new compound, a preferred method in accordance with the invention comprises heating cyclohexane-1,4-bis(methylamine) to an elevated temperature, e.g., 300 to 500° C., in the presence of a deamination-type catalyst such as catalytic alumina. The cyclohexane-1,4-bis(methylamine) is deaminated to yield one mol of the desired product, 3-azabicyclo[3.2.2]nonane, and one mol of $NH_3$. The reaction can be carried out with or without the use of an inert carrier or purge gas such as nitrogen.

Another form of the preferred method comprises heating 4-aminomethylcyclohexanemethanol, e.g., to 300 to 500° C., in the presence of a dehydration catalyst such as alumina. The 4-aminomethylcyclohexanemethanol is dehydrated to yield one mol of the desired product 3-azabicyclo[3.2.2]nonane and one mol of $H_2O$.

The following example illustrates the latter method:

EXAMPLE 2

A 500 cc. round bottom 3-neck flask, equipped with a feed funnel, nitrogen inlet, mechanical stirrer, thermometer, heating mantle, distillation head and a receiver, was charged with 250 g. of granular alumina. The feed funnel was charged with 4-aminomethylcyclohexanemethanol. The aluminum oxide in the reaction flask was heated with stirring, under a constant nitrogen purge, to 365° C. When the temperature of the aluminum oxide had reached 365° C., the nitrogen flow adjusted to 1.25 mols nitrogen per hour and the feed of 4-aminomethylcyclohexanemethanol was started. The feed rate was adjusted to give 2.93 mols 4-aminomethylcyclohexanemethanol per hour. These conditions of feed rate and temperature, ±15° C., were maintained for 20 minutes, after which time the 4-aminomethylcyclohexanemethanol feed was stopped and the heat turned off the reaction flask. The crude product which had collected in the receiver was purified by distillation. A yield of 24.8% of 3-azabicyclo[3.2.2]nonane was obtained, based on the amount of 4-aminomethylcyclohexanemethanol consumed during the reaction.

Examples 3 and 4, below, illustrate preferred embodiments of the process in which the feed is passed continuously downflow through a vertical reactor tube containing a fixed bed of alumina catalyst. The reactor was constructed of 25 mm. O.D. Vycor glass tubing about 15 inches in length. The vertical tube was packed with 3 inches of Vycor chips at the lower (exit) end, 49.5 g. of aluminum oxide of 7–14 mesh in the middle, and 4 inches of Vycor chips at the upper (inlet) end. The inlet end of the reactor tube was connected with a feed funnel via an intermediate steam-heated preheater tube, and with a nitrogen carrier gas inlet line. A closed end Vycor tube of 9 mm. O.D. serving as a thermowell extended into the aluminum oxide portion of the reactor and contained a thermocouple connected with a temperature controller, which controlled an electric furnace surrounding the catalytic section of the reactor tube. The exit end of the reactor tube connected with product recovery means, including in series, a first receiver cooled with Dry Ice, a water-cooled condenser, condenser, and a cooled with ice, a second water-cooled condenser, and a vent.

EXAMPLE 3

The feed funnel was charged with 4-aminomethylcyclohexanemethanol and a nitrogen pressure of 24–27 cm. was maintained on the feed funnel. The furnace was set to maintain a temperature of 380° C. (±10° C.) at the midpoint of the aluminum oxide bed. Flow of nitrogen into the inlet of the reactor via the carrier gas inlet line was then started at a rate of 0.84 mol/hr. After 15 minutes the feed of 4-aminomethylcyclohexanemethanol was started and adjusted to 0.75 mol/hr. These conditions were maintained for 8 hours. Contact time of the reaction was 2.0 seconds. The yield of 3-azabicyclo[3.2.2]nonane was 33% of the 4-aminomethylcyclohexanemethanol consumed.

EXAMPLE 4

The procedure of Example 3 was repeated, but using 1,4-cyclohexanebis(methylamine) as the feed instead of 4 - aminomethylcyclohexanemethanol. The temperature range was 360 to 388° C. with a nitrogen feed of 0.84 mol/hr. and the 1,4-cyclohexanebis(methylamine) feed of 0.68 mol/hr. Contact time was 2.23 seconds. Of the 1,4-cyclohexanebis(methylamine) fed 58.9% was consumed and 49.9% of the material consumed was converted to 3-azabicyclo[3.2.2]nonane.

The following is another example of the preparation of 3-azabicyclo[3.2.2]nonane from 1,4-cyclohexanebis (methylamine) in accordance with the preferred procedure of our invention.

EXAMPLE 5

The apparatus used for the reaction consisted of a 36 inch, 1.0 inch O.D. thin-wall, vertical stainless steel tube. The tube was packed with 2¼ inch of 5 mm. solid glass beads on the bottom, 200 ml. of activated alumina (Alcoa Grade F–1, 7–14 mesh) in the middle, and 5 inches of 5 mm. solid glass beads on top. A steam-jacketed condenser attached to the top of the pyrolysis tube served as a preheater. The nitrogen supply was connected at a point between the pyrolysis tube and the preheater. The 1,4-cyclohexanebis(methylamine) feed line was connected to the top of the preheater. The pyrolysis section was heated by external electric heaters. A thermocouple was inserted into a ¼ inch O.D. stainless steel thermowell located at the midpoint of the catalyst bed, and the lead wires were connected to a temperature indicator-controller. For a typical run, the pyrolysis temperature was maintained at 385 to 395°; the feed rate was 8.4 g./min. of 1,4-cyclohexanebis-(methylamine) and 1.47 g./min. of nitrogen (this is a ratio of 0.885 mol of nitrogen/mol of 1,4-cyclohexanebis(methylamine)/hr.). The crude reaction product was collected in a chilled flask and the nitrogen and reaction gases were vented to a hood. These conditions were maintained for 15.5 hr., during which time 7,840 g. (55 mol) of 1,4-cyclohexanebis(methylamine) was fed to the unit. The total crude product obtained weighed 7,269 g. Distillation of the crude product at atmospheric pressure to a base temperature of 260 to 270° yielded 4,655 g. of a fraction rich in 3-azabicyclo[3.2.2]nonane which crystallized on standing. The crystals were collected and recrystallized from an equal weight of acetone to yield 1,480 g. of 3-azabicyclo[3.2.2]nonane. Gas chromatography of the filtrates of this first fraction indicated 1,854 g. of 1,4-cyclohexanebis(methylamine) and 721 g. of 3-azabicyclo[3.2.2]nonane present. The remainder of the crude product was distilled at 1–5 mm. to a base temperature of 200 to 225°. The yield was 1,957 g. of unchanged 1,4 - cyclohexanebis(methylamine). Thus a total of 2,201 g. (17.6 mol) of 3-azabicyclo[3.2.2]nonane was produced. The yield was 62.1% of the theoretical amount. A total of 3,811 g. (26.8 mol) of 1,4-cyclohexanebis(methylamine) was recovered for a conversion of 51.4%. Infrared spectra of the crystalline solid showed a strong $\nu$(—NH) band at $3.04\mu$ (3,290 cm.$^{-1}$). The NMR spectra indicated the presence of two methylene groups, ten cyclohexane ring protons, and a single —NH proton. These data, along with the chemical reactions, confirm the bicyclic structure.

We have demonstrated the use of alumina as a catalyst for deamination of 1,4-cyclohexanebis(methylamine) and for dehydration of 4-aminomethylcyclohexanemethanol, but our process is not limited to the use of this particular catalyst. We have discovered that a broad range of catalytic materials can be used. Many porous solids of large surface area are active catalysts for vapor phase deamination or dehydration of organic compounds and in general such deamination and dehydration catalysts can be used in our process. Although a broad range of catalysts can be used, we have found that a catalyst is essential for satisfactory operation. This fact is shown by the inactivity of non-porous solids such as α-alumina and Vycor glass chips.

Materials which we have found to have fair-to-good catalytic activity for vapor phase conversion of 1,4-cyclohexanebis(methylamine) to 3-azabicyclo[3.2.2]nonane include porous solids such as porous catalytic aluminas (i.e., aluminas other than α-alumina) and such aluminas modified with other substances; activated carbons; and synthetic and natural silicates. The preferred catalysts comprise difficulty reducible porous oxides and have a large surface area, e.g., at least about 0.4 and preferably at least about 75 square meters per gram. These include the various crystalline forms of alumina such as gamma-alumina, chi-alumina, eta-alumina, etc., and mixtures thereof; activated carbon; phosphates such as calcium nickel phosphate; natural and synthetic silicates including acid-treated clays, synthetic and natural zeolites such as the well-known molecular sieves, synthetic composites such as silica-alumina, silica-zirconia, silica-magnesia, sodium-aluminum-silicate, pumice and the like. Generally, therefore, the preferred catalysts include natural and synthetic clays, silicates and phosphates that are stable up to 600° C.; activated carbons; and non-oxidizing acidic oxides such as porous aluminas, titania, molybdena, zirconia, etc. By "non-oxidizing" we mean oxides that, under the reaction conditions and during the on-stream period of our process, are in a difficulty reducible state and do not react with and oxidize the reactants or products to any substantial extent. Silica gel can be used but it not as active as the preferred catalysts. Good catalysts can be prepared by depositing alkali metal oxides or hydroxides on alumina or silica gel and heating. Other possibilities include metallic or non-metallic phosphates (boron phosphate).

The preferred dehydration catalysts for converting 1,4-cyclohexanedimethanol or 4 - aminomethylcyclohexanemethanol to 3-azabicyclo[3.2.2]nonane include catalytic alumina, silica gel and phosphoric acid on a porous support such as alumina or kieselguhr.

Metallic catalysts such as copper chromite and ferric oxide, although active, are destructive. Meallic nickel is also destructive but can be used as a component of a supported catalyst, e.g., nickel on kieselguhr. Other metals, such as cobalt, iron, ruthenium, platinum, palladium, chromium, tungsten and molybdenum, when too active alone can be employed as components of composite catalysts comprising a minor amount, e.g. 0.1 to 25 weight percent, of the metal or of a stable compound thereof and a major amount of a porous support such as alumina, silica gel, pumice, activated carbon, kieselguhr or the like. Other possibilities include iron and other Group VIII metals in the form of carbides, silicides and pyrophosphates supported on a porous carrier. Rare earths, as represented by 10% cerium oxide on kieselguhr, will have at least moderate activity although kieselguhr alone will generally be preferred. We have found that magnesium oxide has no activity for the reaction of our process except at very high temperature. The same can be expected of the oxides of calcium, zinc and cadmium, although such oxides can be compounded with porous carriers such as silica gel or alumina to form usable catalysts.

Thus, unless otherwise indicated, when our claims recite the use of a catalytic substance of the types we have mentioned, we mean to include the possibility that such catalytic substance is present as a component of a composite catalyst, preferably as a major component. These composites can contain, usually in minor amount, other substances which alone may not be suitable as catalysts but which may be useful in the composite as a catalyst promoter or modifier or otherwise.

The suitability of various catalysts is illustrated by Table I below which lists the yields and conversions obtained in the conversion of 1,4-cyclohexanebis(methylamine) to 3-azabicyclo[3.2.2]nonane in the presence of a number of different solid contact materials. Unless otherwise noted in the table these data were obtained by using a contact time of 2 seconds, a reaction temperature of 390 to 400° C. and a molar ratio of nitrogen to 1,4-cyclohexanebis(methylamine) of 1:1. The yields and conversions were calculated from data obtained from gas chromatographic analysis of the crude products, according to the following equations:

% Conversion =
$$\frac{\text{Moles of 1,4-Cyclohexanebis(methylamine) Consumed}}{\text{Moles of 1,4-Cyclohexanebis(methylamine) Fed}}$$

% Yield =
$$\frac{\text{Moles of 3-Azabicyclo[3.2.2]nonane Obtained}}{\text{Moles of 1,4-Cyclohexanebis(methylamine) Consumed}}$$

*Table I*

| Catalyst | Percent Conversion [1] | Percent Yield [1] |
|---|---|---|
| 1. Alumina (Alcoa F-1) | 95 | 62.5 |
| 2. Alumina (Harshaw Al 0104) | 37–49 | 55–87 |
| 3. Alumina (Harshaw Al 1404) | 51–67 | 48–72 |
| 4. MoO₃ on Alumina | 26–74 | 38–49 |
| 5. Silica Gel [a] | 4 | 63 |
| 6. Titanium Dioxide | 20–30 | 37–58 |
| 7. Magnesium Oxide [b] | | |
| 8. Copper Chromite [c] | | |
| 9. Synthetic Zeolite, NaAlSiO₃ (Molecular Sieve 13A) | 60–72 | 69–73 |
| 10. Clay Montmorillonite | 50–63 | 66–92 |
| 11. Activated Carbon | 76–93 | 60–71 |
| 12. Nickel on Kieselguhr [d] | 45–52 | 17–31 |
| 13. Ca, Ni Phosphates (Dow B) | 25–40 | 40–58 |
| 14. α-Alumina [e] | | |
| 15. Fe₂O₃ [f] | | |
| 16. Silica Alumina | 57–89 | 48–61 |
| 17. Synthetic MgSiO₄ | 38–57 | 81–96 |
| 18. Pumice | 18–31 | 27–68 |
| 19. Ce(O)₂ (10%) on Kieselguhr | 21–30 | 92–94 |
| 20. Kieselguhr | 53–55 | 75–88 |
| 21. Vycor Glass Chips [g] | | |

[1] As defined supra.
[a] One run at 450° C.
[b] Very little activity, although at 500° C. some 3-azabicyclo[3.2.2]nonane produced.
[c] Initial temperature rise from 400 to 700° C. Some 3-azabicyclo[3.2.2]nonane produced but not very good.
[d] Temperature 300° C.
[e] No apparent activity in the range of 400 to 525° C.
[f] Reduced the catalyst with complete destruction of 1,4-cyclohexanebis(methylamine). Some 3-azabicyclo[3.2.2]nonane produced.
[g] No activity between 350 to 550° C.

From the above it can be seen that we have provided a valuable method for preparing a compound which previously was unavailable because no method of preparation was known. The compound 3-azabicyclo[3.2.2]nonane is a white, crystalline, strongly basic solid $$(K_b = 3 \times 10^{-4})$$

which absorbs carbon dioxide readily. It sublimes at ordinary pressures and temperatures. The novel compound represents a new ring system and is valuable for preparing a number of useful derivatives. It has been found that this compound undergoes reactions typical of secondary aliphatic amines. For instance, it can be reacted with isobutyraldehyde to yield an enamine of the formula $$Z\text{---}CH\text{=}C(CH_3)_2$$

wherein the radical, Z—, represents the 3-azabicyclo[3.2.2]nonan-3-yl radical. Enamines of this type can be reacted with dimethylketene to obtain compounds of important utility as dye intermediates, fuel oil stabilizers, etc., as disclosed in U.S. patent application Serial No. 71,398 of Kent C. Brannock and James C. Martin, entitled "Tertiary Amino Alcohols of the Cyclobutane Series," filed November 25, 1960, now abandoned, and the continuation-in-part thereof Serial No. 112,794, filed May 26, 1961. In addition, the tertiary amines derived from 3-azabicyclo[3.2.2]nonane show a remarkably high basicity. They are useful basic catalysts for polymerization of pivalolactone and similar compounds, as well as for preparation of polyurethanes from diols and diisocyanates. Also, polymers suitable for basic ion-exchange substances may be prepared from certain strongly basic 3-azabicyclo[3.2.2]nonane derivatives, which may in addition be used for the preparation of cation active surfactants. Moreover, quite unexpectedly and surprisingly we have found that the compound of our invention may be used in the synthesis of numerous physiologically active substances.

The invention has been described in considerable detail with particular reference to certain preferred embodiments thereof, but it will be understood that variations and modifications can be effected within the spirit and scope of the invention as described hereinabove, and as defined in the appended claims.

We claim:

1. 3-azabicyclo[3.2.2]nonane.

2. The method of preparing 3-azabicyclo[3.2.2]nonane which comprises contacting a stream of a compound from the group consisting of 1,4-cyclohexanedimethanol, 4-(aminomethyl)cyclohexanemethanol, and 1,4-bis(aminomethyl)cyclohexane in the vapor phase with a porous, solid catalyst from the group consisting of non-oxidizing, inorganic, acidic oxides; activated carbon; natural and synthetic clays; and silicates and phosphates that are stable up to 600° C. at a temperature above about 300° C. and in the presence of ammonia when said compound is 1,4-cyclohexanedimethanol.

3. The method of preparing 3-azabicyclo[3.2.2]nonane which comprises contacting a stream of 4-(aminomethyl)-cyclohexanemethanol in admixture with an inert gas at a temperature of about 300 to 500° C. with a porous, solid deamination catalyst from the group consisting of non-oxidizing, inorganic, acidic oxides; activated carbon; natural and synthetic clays; and silicates and phosphates that are stable up to 600° C.

4. The method of preparing 3-azabicyclo[3.2.2]nonane which comprises contacting a stream of 1,4-bis-(aminomethyl)cyclohexane in admixture with an inert gas at a temperature of about 300 to 500° C. with a porous, solid deamination catalyst from the group consisting of non-oxidizing, inorganic, acidic oxides; activated carbon; natural and synthetic clays; and silicates and phosphates that are stable up to 600° C.

5. The method according to claim 4 in which the catalyst is porous alumina.

6. The method according to claim 4 in which the catalyst is activated carbon.

7. The method according to claim 4 in which the catalyst is a silicate.

8. The method of preparing 3-azabicyclo[3.2.2]nonane which comprises continuously passing a vapor stream of 1,4-bis-(aminomethyl)cyclohexane in admixture with an inert gas through a reaction zone containing a catalyst bed of alumina at a temperature of 300 to 500° C. and separating 3-azabicyclo[3.2.2]nonane from the reaction zone effluent.

9. The method according to claim 8 in which said inert gas is nitrogen.

10. The method of preparing 3-azabicyclo[3.2.2]nonane which comprises contacting 1,4-cyclohexanedimethanol with ammonia in the presence of a nickel catalyst at elevated temperature, recovering a reaction product comprising a mixture of 3-azabicyclo[3.2.2]nonane and 4-aminomethylcyclohexanemethanol and separating 3-azabicyclo[3.2.2]nonane from said mixture.

References Cited by the Examiner

UNITED STATES PATENTS

| | | | |
|---|---|---|---|
| 2,412,209 | 12/1946 | Dickey et al. | 260—293 |
| 2,554,736 | 5/1951 | Haefliger et al. | 260—239 |
| 2,754,330 | 7/1956 | Schreyer et al. | 260—293 |
| 2,790,788 | 4/1957 | Kamlet | 260—239 |
| 2,790,804 | 4/1957 | Silverstone | 260—313 |
| 2,885,402 | 5/1959 | MacLean et al. | 260—293 |
| 2,952,688 | 9/1960 | Kline et al. | 260—293 |
| 2,962,496 | 11/1960 | Grogan et al. | 260—239 |
| 3,078,272 | 2/1963 | Mull | 260—239 |

FOREIGN PATENTS

| | | |
|---|---|---|
| 65,644 | 4/1950 | Netherlands. |
| 738,448 | 8/1943 | Germany. |

OTHER REFERENCES

Rice et al.: Journ. Organic Chemistry, vol. 24, pp. 7–11 1959.

Hall, Jour. Amer. Chem. Soc., vol. 80, pp. 6412–20 (1958).

Kompps, Berichte, vol. 68, pp. 1267–72 (1935).

Malachowski et al.: Berichte, vol. 71, page 760 (1938).

Wollweber et al.: Chemical Abstracts, vol. 57, page 16561f (1962).

ALEX MAZEL, *Primary Examiner.*

IRVING MARCUS, N. S. RIZZO, WALTER A. MODANCE, *Examiners.*

J. T. MILLER, A. D. ROLLINS, *Assistant Examiners.*

UNITED STATES PATENT OFFICE
CERTIFICATE OF CORRECTION

Patent No. 3,280,105　　　　　　　　　　　　October 18, 1966

Vada L. Brown et al.

It is hereby certified that error appears in the above numbered patent requiring correction and that the said Letters Patent should read as corrected below.

Column 1, lines 65 to 70, the formula should appear as shown below instead of as in the patent:

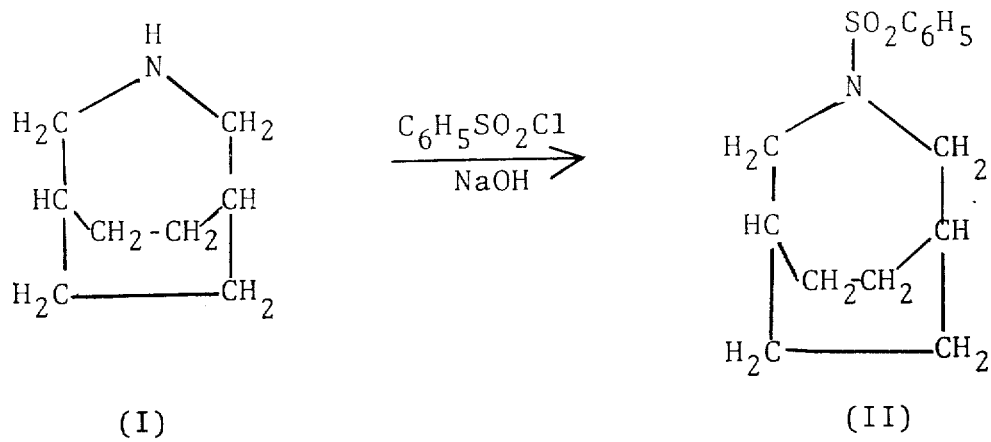

(I)　　　　　　　　　　　　　　　　(II)

column 3, lines 4 and 5, strike out "with Dry Ice, a water-cooled condenser, condenser, and a cooled with ice, a second water-cooled condenser, and a" and insert instead -- with dry ice, a water-cooled condenser, a second receiver cooled with ice, a second water-cooled condenser, and a --.

Signed and sealed this 12th day of September 1967.

(SEAL)
Attest:

ERNEST W. SWIDER　　　　　　　　　　EDWARD J. BRENNER
Attesting Officer　　　　　　　　　　Commissioner of Patents